United States Patent [19]

Wenzel et al.

[11] Patent Number: 4,496,678
[45] Date of Patent: Jan. 29, 1985

[54] VISCOSITY STABILIZED DISPERSIONS

[75] Inventors: Wolfgang D. Wenzel, New Martinsville; Michael N. Carmosino, Moundsville, both of W. Va.

[73] Assignee: Mobay Chemical Corporation, Pittsburgh, Pa.

[21] Appl. No.: 612,278

[22] Filed: May 21, 1984

[51] Int. Cl.$^3$ .................................................. C08K 5/05
[52] U.S. Cl. .................................. 524/157; 524/159; 524/161; 524/166
[58] Field of Search ................ 524/161, 159, 166, 157

[56] References Cited

U.S. PATENT DOCUMENTS

| | | | |
|---|---|---|---|
| 3,325,421 | 6/1967 | Muller | 252/308 |
| 4,042,537 | 8/1977 | Dahm et al. | 521/128 |
| 4,089,835 | 5/1978 | König et al. | 524/100 |
| 4,293,470 | 10/1981 | Cuscurida | 544/401 |
| 4,296,213 | 10/1981 | Cuscurida | 521/166 |
| 4,374,209 | 2/1983 | Rowlands | 521/11.6 |

Primary Examiner—Lewis T. Jacobs
Attorney, Agent, or Firm—Gene Harsh; Joseph C. Gil

[57] ABSTRACT

The present invention is directed to a composition comprising:

(a) a dispersion of a polyurea and/or polyhydrazodicarbonamide in a relatively high molecular weight organic compound containing at least two hydroxyl groups, wherein the concentration of the polyurea and/or polyhydrazodicarbonamide is from 1 to 40% by weight of the dispersion, (b) from 2 to 10% by weight of water based on the weight of component (a), and (c) from 3 to 10% by weight based on the weight of components (a) and (b), of a sulphonate diol corresponding to the formula:

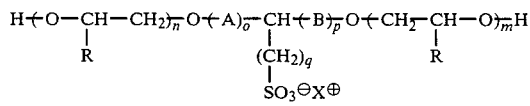

wherein

A and B may be the same or different and represent a difunctional aliphatic hydrocarbon radical containing from 1 to 6 carbon atoms;

R represents hydrogen, an aliphatic hydrocarbon radical containing from 1 to 4 carbon atoms, or a phenyl radical;

$X^\oplus$ represents an alkali metal cation, or an ammonium group which may be substituted;

n and m represent the same or different numbers of from 1 to 30;

o and p each represent 0 or 1; and q represents 0, 1 or 2.

6 Claims, No Drawings

VISCOSITY STABILIZED DISPERSIONS

BACKGROUND OF THE INVENTION

Dispersions of polyureas and/or polyhydrazodicarbonamides in organic compounds containing at least one hydroxyl group are known and used extensively in the production of polyurethane products (see, e.g., U.S. Pat. Nos. 3,325,421; 4,042,537; 4,089,835; 4,293,470; 4,296,213; and 4,374,209). In the commercial production of such dispersions, any water present is generally removed to a level below 0.5% by weight. Before removal of the water, such dispersions typically contain around 1.5% by weight of water. For many applications, such as the manufacture of polyurethane based shoe soles, the water content must be as low as possible. For other applications, however, higher water contents, e.g., as high as 3 to 5% by weight, are desirable. However, when water is added to the dispersion, the resultant dispersion may increase in viscosity with time. In the case of the dispersions which contain less than 0.5% by weight to begin with, the increase can be quite dramatic.

The present invention is directed to a dispersion of the type noted above which contains water in an amount of from 2 to 10% by weight and which has a relatively stable viscosity with time.

DESCRIPTION OF THE INVENTION

The present invention is directed to a composition comprising:

(a) a dispersion of a polyurea and/or polyhydrazodicarbonamide in a relatively high molecular weight organic compound containing at least two hydroxyl groups, wherein the concentration of the polyurea and/or polyhydrazodicarbonamide is from 1 to 40% by weight of the dispersion, (b) from 2 to 10% by weight, and preferably from 2 to 5% by weight of water based on the weight of component (a), and (c) from 3 to 10% by weight, and preferably from 3 to 6% by weight, based on the weight of components (a) and (b), of a sulphonate diol corresponding to the formula:

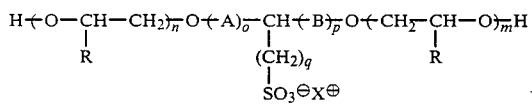

wherein

A and B may be the same or different and represent a difunctional aliphatic hydrocarbon radical containing from 1 to 6 carbon atoms;

R represents hydrogen, an aliphatic hydrocarbon radical containing from 1 to 4 carbon atoms, or a phenyl radical;

$X \oplus$ represents an alkali metal cation, or an optionally substituted ammonium group;

n and m represent the same or different numbers of from 1 to 30;

o and p each represent 0 or 1; and q represents 0, 1 or 2.

Component (a) of the present invention is a dispersion of a polyurea and/or polyhydrazodicarbonamide in an organic compound containing at least two hydroxyl groups. As noted earlier, these dispersions are known in the art, are commercially available, and have been described, e.g., in U.S. Pat. Nos. 3,325,421; 4,042,537; 4,089,835; 4,293,470; 4,296,213 and 4,374,209, the disclosures of which are herein incorporated by reference. In general, the dispersions useful herein are produced by reacting monofunctional, bifunctional or higher functional isocyanates with (a) polyamines containing primary and/or secondary amino groups and/or (b) hydrazines and/or hydrazides, in the presence of an organic compound which contains at least two hydroxyl groups. As is known and as described in the above-noted U.S. patents, such dispersions can be produced having a wide range of solids contents. In general, the solids content of the dispersion itself will range from 1 to as high as 40 percent, and preferably from 5 to 40 percent by weight.

Component (b) is water and is added to the dispersion. As noted earlier, the water content of the dispersion before addition of the water is generally less than 1.5% by weight, and in the case of commercial dispersions is generally less than 0.5% by weight.

Component (c) is a diol sulfonate of the formula noted.

Preferred sulfonate diols are those of the following formulae where

R represents hydrogen or a methyl group, $X \oplus$ represents an alkali metal cation, and n and m represent the same or different numbers of from 1 to 5:

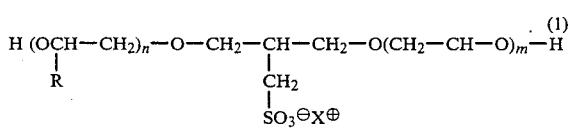

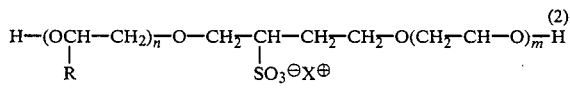

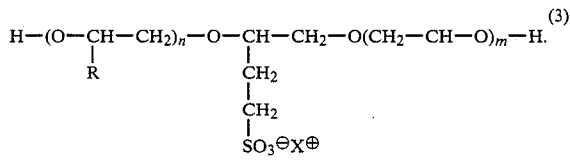

The viscosity stabilized compositions of the present invention are suitable for the production of a wide variety of polyurethane foam products.

The invention is further illustrated, but is not intended to be limited by the following examples in which all parts and percentages are by weight unless otherwise specified.

EXAMPLES

In the examples which follow, the following materials were used:

(a) Dispersion—A commercially available dispersion having an OH number of about 28 and consisting of a polyhydrazodicarbonamide in a glycerin initiated propylene oxide/ethylene oxide polyether with an OH number of 35, and produced by reacting toluene diisocyanate and hydrazine hydrate in the presence of the polyether, according to U.S. Pat. No. 4,089,835. The dispersion has a solids content of 20 percent by weight and a maximum water content of 0.50 percent by weight.

(b) DS—a propoxylated adduct of 2-butene diol-(1,4) and $NaHSO_3$ (OH number of 264; 70% solution in toluene).

(c) POLYETHER 1: a propylene oxide/ethylene oxide polyether started on butanol (ratio of propylene oxide to ethylene oxide = 15:85), having an OH number of 26.

(d) POLYETHER 2: an ethylene oxide polyether started on nonyl phenol, having an OH number of about 9.

(e) NB: a neutralization product of a N-methyldiethanolamine started propylene oxide polyether (OH number 191) and acetic acid.

The dispersion was first mixed with water so that the total water content was 3.5% by weight. Various amounts of DS were than added. Viscosities at 25° C. were then measured and recorded with time. The amounts of DS added and the results were as indicated in Table I.

TABLE I

| Time (hrs) | Control (no additive) | Percent by Weight DS Added | | | | |
|---|---|---|---|---|---|---|
| | | 1.15% | 1.96% | 3.02% | 4.21% | 5.22% |
| 0 | 5800 cps | 5800 cps | 5200 cps | 4600 cps | 4450 cps | 4200 cps |
| 24 | 15200 cps | 37600 cps | 14800 cps | 6200 cps | 5000 cps | 4700 cps |
| 48 | — | 114000 cps | — | — | — | 5200 cps |
| 72 | — | — | — | — | — | 5550 cps |
| 96 | 46400 cps | — | 54400 cps | 14400 cps | 7300 cps | 5900 cps |
| 120 | — | — | — | 15600 cps | 7600 cps | 6500 cps |

Two blends of the dispersion and water were prepared. The first blend (BLEND 1) contained 3% by weight water and the second (BLEND 2) contained 3.5% by weight water.

To one portion of BLEND 1, 1% by weight of POLYETHER 1 was added. The viscosity increased from 7000 cps at 25° C. to 78,000 cps at 25° C. after 96 hours.

To a second portion of BLEND 1, 5% by weight of POLYETHER 1 was added. The viscosity increased from 6200 cps at 25° C. to 168,000 cps at 25° C. after 96 hours.

To a third portion of BLEND 1, 5% by weight of NB was added. The viscosity increased from 7965 cps at 25° C. to 14,300 cps at 25° C. after only 24 hours.

To a first portion of BLEND 2, 1.06% by weight of POLYETHER 2 was added. The viscosity increased from 5750 cps at 25° C. to 24,000 cps at 25° C. after only 24 hours.

To a second portion of BLEND 2, 5.20% by weight of POLYETHER 2 was added. The viscosity increased from 13,600 cps at 25° C. to 90,000 cps at 25° C. after only 24 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A composition comprising:
(a) a dispersion of a polyurea and/or polyhydrazodicarbonamide in a relatively high molecular weight organic compound containing at least two hydroxyl groups, wherein the concentration of the polyurea and/or polyhydrazodicarbonamide is from 1 to 40% by weight of the dispersion.
(b) from 2 to 10% by weight of water based on the weight of component (a), and
(c) from 3 to 10% by weight based on the weight of components (a) and (b), of a sulphonate diol corresponding to the formula:

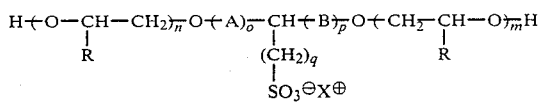

wherein
A and B may be the same or different and represent a difunctional aliphatic hydrocarbon radical containing from 1 to 6 carbon atoms;
R represents hydrogen, an aliphatic hydrocarbon radical containing from 1 to 4 carbon atoms, or a phenyl radical;
$X\oplus$ represents an alkali metal cation, or an ammonium group which may be substituted;
n and m represent the same or different numbers of from 1 to 30;
o and p each represent 0 or 1; and
q represents 0, 1 or 2.

2. The composition of claim 1 containing from 2 to 5% by weight water.

3. The composition of claim 1 containing from 3 to 6% by weight of component (c).

4. The composition of claim 1 wherein component (c) is a sulphonate diol corresponding to the formula:

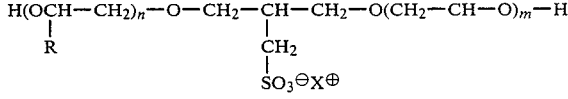

and wherein R is hydrogen or a methyl group, $X\oplus$ represents an alkali metal cation, and n and m represent the same or different numbers of from 1 to 5.

5. The composition of claim 1 wherein component (c) is a sulphonate diol corresponding to the formula:

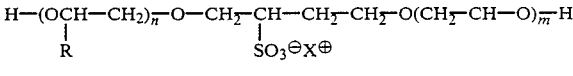

and wherein R is hydrogen or a methyl group, $X\oplus$ represents an alkali metal cation, and n and m represent the same or different numbers of from 1 to 5.

6. The composition of claim 1 wherein component (c) is a sulphonate diol corresponding to the formula:

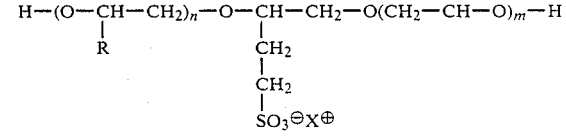

and wherein R is hydrogen or a methyl group, $X\oplus$ represents an alkali metal cation, and n and m represent the same or different numbers of from 1 to 5.

* * * * *